United States Patent [19]

Azuma et al.

[11] Patent Number: 6,077,592
[45] Date of Patent: Jun. 20, 2000

[54] WIPER BLADE

[75] Inventors: Ryou Azuma, Tokyo-to; Junichi Kurihara, Kazo; Noboru Umemoto, Mie-ken; Fuminori Satoji, Yokkaichi, all of Japan

[73] Assignees: NTN Corporation; Nippon Water Blade Co., Ltd., both of Japan

[21] Appl. No.: 08/928,721

[22] Filed: Sep. 12, 1997

[30] Foreign Application Priority Data

Sep. 20, 1996 [JP] Japan ................................. 8-250246

[51] Int. Cl.$^7$ .......................... B32B 27/18; B32B 27/20; B60S 1/04; B60S 1/38
[52] U.S. Cl. .......................... 428/192; 428/194; 428/421; 428/422; 15/236.01; 15/245; 15/250.001; 15/250.48
[58] Field of Search ..................... 428/421, 422, 428/192, 194; 15/236.01, 245, 118, 121, 250.001, 250.48

[56] References Cited

FOREIGN PATENT DOCUMENTS

| | | |
|---|---|---|
| 55-113543 | 9/1980 | Japan . |
| 62-211602 | 9/1987 | Japan . |
| 1-188797 | 7/1989 | Japan . |
| 4218450 | 8/1990 | Japan . |
| 5-097015 | 4/1993 | Japan . |
| 597015 | 4/1993 | Japan . |
| 7144614 | 6/1995 | Japan . |

OTHER PUBLICATIONS

JP–55–113545 (English Abstract), "Forming of Wiper Blade Rubber" Sep. 1980.
JP–5–97015 (English Abstract), "Wiper Blade for Car" Apr. 1993.
JP–6–200320 (English Abstract), "Coating Material for Resin" Feb. 1996.
JP–1–188797 (English Abstract), "Sliding Material" Jul. 1989.
JP–3–21339 (English Abstract), "Rubber Molding with Surface Film" Apr. 1985.
JP–62–232497 (English Abstract), "Sliding Material" Oct. 1987.

*Primary Examiner*—Vivian Chen
*Attorney, Agent, or Firm*—Hedman, Gibson, & Costigan, P.C.

[57] ABSTRACT

A wiper blade comprising a body made of an elastomeric material; and a surface coating layer positioned on a surface of the body and comprising a fluorine-containing resin having hydroxyl groups in the molecules thereof and a hardening agent having reactivity with the hydroxyl groups and optionally a solid lubricant. The surface coating layer is formed only on both side surfaces of the body. Thus, the wiper blade has a high degree of flexibility and restoring property; a high degree of durability; and judders in a slight extent when it slides on a glass surface in contact therewith; a high wiping performance; and maintains its wiping performance for a long time.

17 Claims, 3 Drawing Sheets

FIG.2A
FIG.2B
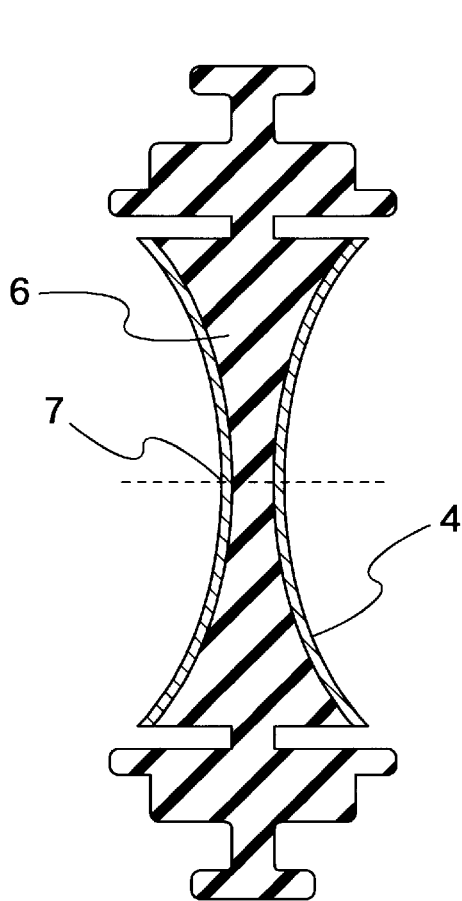
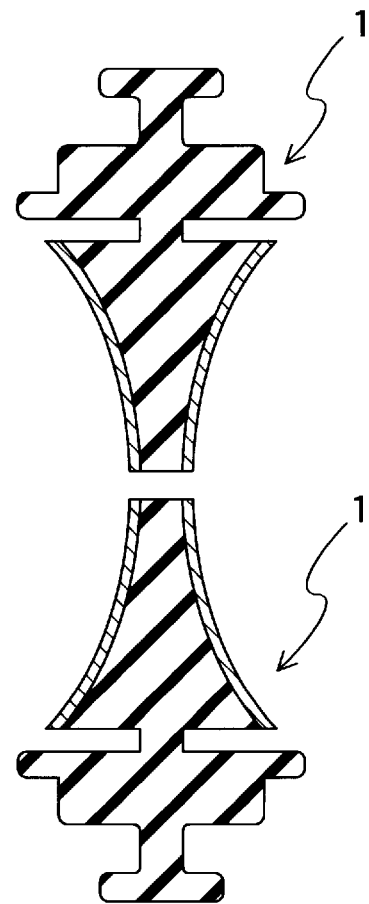
FIG.3
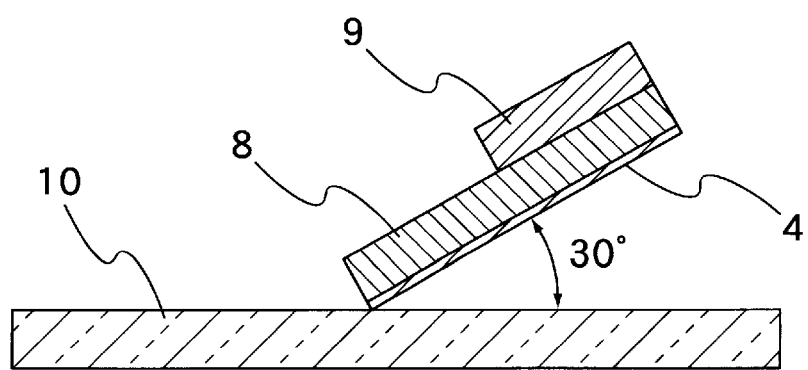

WIPER BLADE

BACKGROUND OF THE INVENTION

In general, the present invention relates to a wiper blade and a method of manufacturing the wiper blade and more particularly, to a wiper blade superior in wiping the surface of a transparent material, for example, glass treated with water-repellent agent and a method of manufacturing the wiper blade.

The wiper blade for a vehicle, train, and the like swings in sliding contact with the surface of a windowpane thereof to allow a driver to secure the visual field. Therefore, it is necessary for the wiper blade to have a high degree of flexibility and restoring property; a high degree of durability such as water-proofness, weatherability, and wear resistance; not to judder on the windowpane; and have a high wiping performance.

In order to comply with such demands, a rubber material which is halogenated to harden the surface thereof so that the wiper blade slides easily on the windowpane and has a high degree of wear resistance is widely used as wiper blades. In addition, the following wiper blades are known: Binder mixed with molybdenum disulfide or graphite is applied to the surface of wiper blade, as disclosed in Laid-Open Japanese Patent Publication No. 55-113545; and a film made of polyvinylidene fluoride, polyvinyl chloride or polyurethane is formed on the surface of wiper blade, as disclosed in Laid-Open Japanese Patent Publication No. 5-97015.

Further, there is disclosed, in Laid-Open Japanese Patent Publication No. 8-48800, a resinous coating material made of rubber or plastic containing solid lubricant as well as silicone rubber and having a low coefficient of friction and a high degree of resistance to wear.

However, the wiper blade comprising the halogenated rubber does not slide on a glass surface sufficiently. In particular, the wiper blade does not slide well on a glass surface to which wax or the like has attached and further, judders when it slides thereon in contact therewith. Thus, the wiper blade has an unfavorable wiping performance. If the rubber is halogenated in a high extent, the surface of the wiper blade is likely to be cracked and marks are left on the glass surface by the sliding contact of the wiper blade with the glass surface.

The wiper blade coated with the binder disclosed in Laid-Open Japanese Patent Publication No. 55-113545 does not judder when it slides on the glass surface in contact therewith and has a superior wiping performance only in a short period of time after the coating is applied to the surface of the wiper blade. But with a long-time use, the coating peels off from the surface of the wiper blade and thus the wiper blade judders when it slides on the glass surface in contact therewith. Thus, the wiper blade deteriorates in its wiping performance with age.

Each of the wiper blades coated with the film disclosed in Laid-Open Japanese Patent Publication Nos. 5-97015 and 8-48800 has a favorable wiping performance on a clean glass surface but judders on a glass surface to which wax, dust or sand has attached and a water-repellent glass surface, thus having an unfavorable wiping performance.

As described above, the conventional wiper blade is inferior in durability and wiping performance and in particular, incapable of wiping the water-repellent glass surface favorably.

SUMMARY OF THE INVENTION

The present invention has been made to solve the above-described problems. It is accordingly an object of the present invention to provide a wiper blade which has a high degree of flexibility and restoring property; a high degree of durability such as water-proofness, weatherability, and wear resistance; and judders in a slight extent when it slides on a glass surface in contact therewith even though wax, dust or sand has attached to the glass surface and a water-repellent glass surface; a high wiping performance; and maintains its wiping performance for a long time.

It is another object of the present invention to provide a method of manufacturing the wiper blade.

A wiper blade of the present invention comprises a body made of an elastomer and a surface coating layer on the body. The coating layer comprises a fluorine-containing resin having reactive groups in a molecule thereof and a hardening agent having reactivity with the reactive groups. And the surface coating layer is formed on only both side surfaces of the body.

The surface coating layer is a mixture of 100 parts by weight of the fluorine-containing resin having the reactive group in a molecule thereof and 10–110 parts by weight of a solid lubricant.

Another wiper blade of the present invention comprises a body made of an elastomer and a surface coating layer on the body. The coating layer comprises a fluorine-containing resin having reactive groups in a molecule thereof and a hardening agent having reactivity with the reactive groups. The surface coating layer comprises a mixture of 100 parts by weight of the fluorine-containing resin having the reactive group in the molecule thereof and 10–110 parts by weight of a solid lubricant.

In the above described wiper blade, the reactive group of the fluorine-containing resin is hydroxyl group, and the hardening agent is an isocyanate compound and/or melamine resin.

The surface coating layer contains polytetrafluoroethylene resin and/or an organosilicone elastomer. The solid lubricant consists essentially of graphite.

The surface coating layer slidably contacts a surface of a transparent material having at least one layer thereof water-repellently treated.

A method of manufacturing the wiper blade of the present invention comprises the steps of forming a plurality of blade bodies continuously in a widthwise direction of the wiper blade, forming a surface coating layer on a surface of each blade body and cutting each blade body in parallel with a lengthwise direction of the wiper blade.

The manufacturing method allows the wiper blade to have the surface coating layer on only both side surfaces of the blade body. The longer side of the wiper blade having a predetermined thickness is defined as the lengthwise direction, and the shorter side thereof is defined as the widthwise direction.

The manufacturing method enhances the edge accuracy of the wiper blade and allows the surface coating layer to be formed on only both side surfaces of the blade body.

"Both side surfaces of the blade body" means surfaces which slidably contact the surface of glass during wiping action. "Wiper blade has the surface coating layer on only both side surfaces of the blade body" means that the surface coating layer is formed on both side surfaces which slidably contact the surface of glass and not on the top surface of the wiper blade.

In addition to the above-described construction, the surface coating layer comprises the fluorine-containing resin having the hydroxyl groups in the molecules thereof and the hardening agent having reactivity with the hydroxyl groups. The surface coating layer firmly adheres to the surface of the blade body made of the elastomer, thus improving the durability of the blade outstandingly. The surface coating layer is a mixture of 100 parts by weight of the fluorine-containing resin and 10–110 parts by weight of the solid lubricant. The surface coating layer having this composition allows the wiper blade to have a high degree of durability and wipes surface of a transparent material, for example, glass having at least one layer treated with water-repellent agent. Further, because the surface coating layer contains the polytetrafluoroethylene resin or the organosilicone elastomer, the surface coating layer has an improved wear resistance and sliding performance.

Because the surface coating layer is a mixture of 100 parts by weight of the fluorine-containing resin and 10–110 parts by weight of the solid lubricant, the surface coating layer wipes the water-repellent glass surface and is durable even though the surface coating layer is formed on the top surface of the wiper blade.

Further, when graphite is used as the solid lubricant, the above-described characteristics can be enhanced.

BRIEF DESCRIPTION OF THE DRAWINGS

FIG. 2A and FIG. 2B are a view showing an example of a method of manufacturing the wiper blade; and FIG. 3 is a view showing a method of measuring a friction coefficient and an abrasion amount.

DESCRIPTION OF THE PREFERRED EMBODIMENTS

Figure 1:
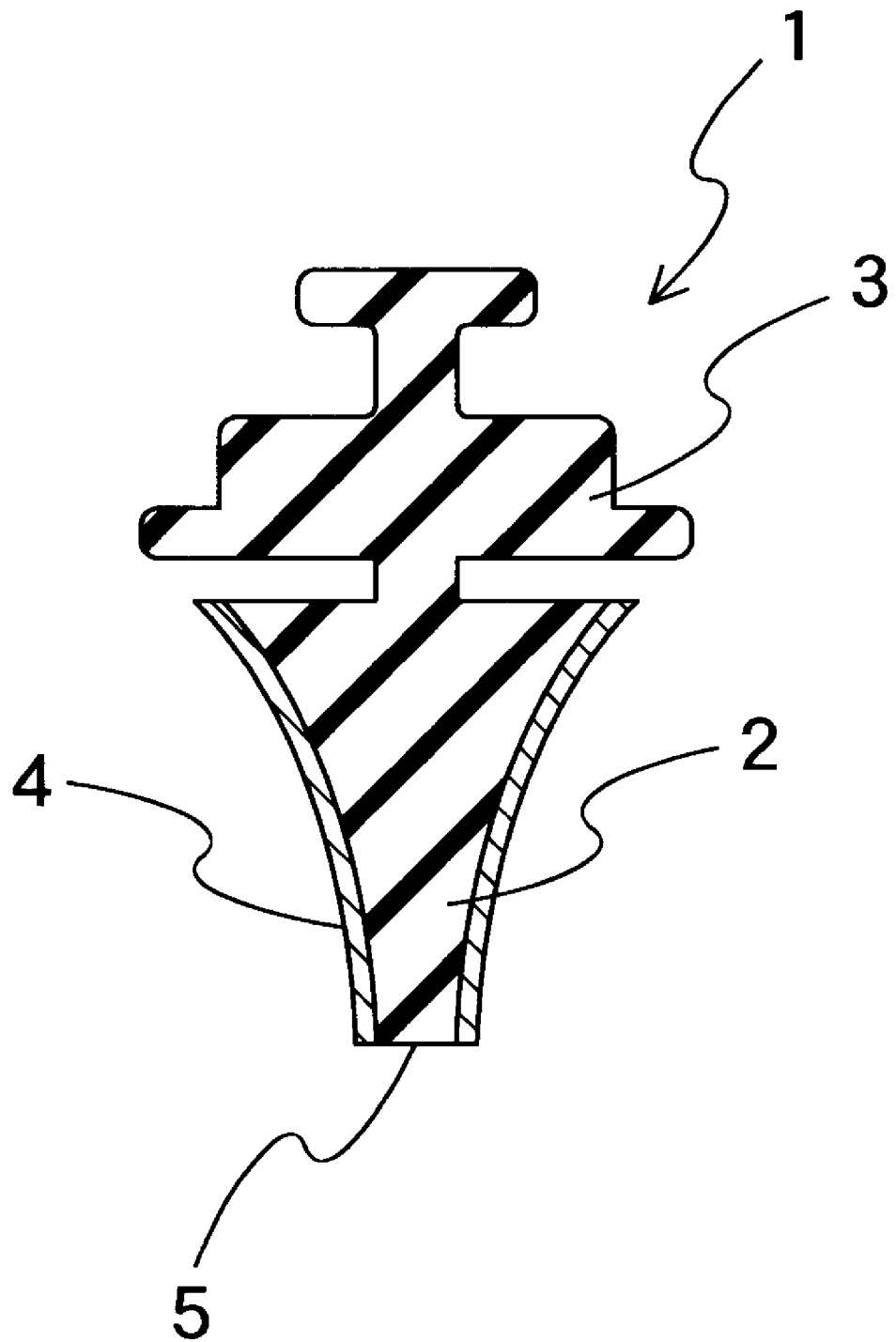
FIG. 1 is a sectional view showing a wiper blade.

The elastomer of the present invention forming the body of the wiper blade is not limited to a specific one, but those displaying rubber elasticity when the wiper blade is operated can be used. For example, natural rubber (NR), isoprene rubber (IR), styrene-butadiene rubber (SBR), butadiene rubber (BR), chloroprene rubber (CR), acrylonitrile-butadiene rubber (NBR), ethylene propylene rubber can be preferably used. The natural rubber (NR) and the styrene-butadiene rubber (SBR) can be preferably used as the elastomers which preferably wipe a glass surface treated with water-repellent agent, without the wiper blade vibrating in sliding contact therewith.

It is preferable that the elastomers have a rubber hardness in a range of 50°–80° measured in accordance with JIS K 6301 to maintain the flexibility and restoring performance of the wiper blade. In order to improve the weatherability of the elastomeric materials, ozone-absorbing agent, age resistance agent, and wax can be added to the elastomers.

In order to improve an adhesion of the surface coating layer to the elastomer, it is preferable that the surface of the elastomer is halogenated, subjected to plasma treatment at low temperatures, corona discharge treatment, and ultraviolet ray irradiation. Halogenation is most favorable to improve the adhesion of the surface coating layer to the elastomer. As the halogenation, chlorination, bromization, iodization or fluorination is used.

The fluorine-containing resin having a reactive group in molecules thereof and constituting the surface coating layer has the reactive group at side chains of the fluorine-containing resin or the terminals of molecular chains thereof. The reactive group includes hydroxyl group (—OH), isocyanate group (—NCO), carboxyl group (—COOH), —NHR group (R of NHR is hydrogen, alkyl group or alkoxyl group), mercapto group (—SH), epoxy group, acetoxy group (—COOCH$_3$), and sulfonic group (—SO$_3$H). The fluorine-containing resin having the hydroxyl group (—OH) in the molecules thereof can be most favorably used. More specifically, the fluorine-containing resin which is a copolymer comprising the unit of fluoroolefin and the unit of vinyl ether and having the hydroxyl group (—OH) in the unit of the vinyl ether can be most favorably used.

It is possible to use the fluorine-containing resin having —C$_x$F$_{2x}$—O— (x is integers of one to four) as the main structural unit thereof and having the above-described reactive group at side chain or the terminal of molecular chain of a polymer having an average molecular weight of about 1,000–10,000.

As the hardening agents which reacts with the fluorine-containing resin having the reactive group in the molecules thereof, it is possible to use those having a functional group which reacts with the reactive group of the fluorine-containing resin. In particular, when the reactive group consists of the hydroxyl group, hardening agents containing the isocyanate group (—NCO) and the —NHR group can be preferably used. These hardening agents can be used singly or as a mixture.

As the hardening agents having the isocyanate group (—NCO), polyisocyanates having two or more isocyanate groups connected with aliphatic group, alicyclic group or aromatic group can be preferably used. For example, hexamethylene diisocyanate, phenylene diisocyanate, tolylene diisocyanate, diphenylmethane diisocyanate, naphthalene diisocyanate can be preferably used. These hardening agents can be used in the form of monomer, dimer or trimer. It is possible to use blocked isocyanates obtained by blocking active isocyanate group with a phenol-contained compound or caprolactam, or to use polyisocyanates which is the product of the reaction of polyols with the polyisocyanate and has the isocyanate group at the terminal of molecular chain thereof.

It is preferable to set the mixing ratio between the fluorine-containing resin having the hydroxyl group (—OH) and the hardening agent having the isocyanate group (—NCO) to 1:0.5–1.1 in equivalent ratio. In order to allow the surface coating layer to be flexible and the wiper blade to have an improved wiping performance, it is more preferable to set the mixing ratio between the fluorine-containing resin and the hardening agent to 1:0.6–1.

As the hardening agent having the —NHR group, melamine resin can be preferably used. For example, butylated methylol melamine and hexamethoxy methylated melamine are preferable.

It is preferable to mix the fluorine-containing resin having the hydroxyl group (—OH) and the hardening agent having the —NHR group with each other at a weight ratio of 6–9:1–4 to allow the wiper blade to have a favorable wiping performance.

The polytetrafluoroethylene resin (hereinafter referred to as PTFE) of the present invention means a polymer of tetrafluoroethylene. It is possible to use the PTFE obtained by any one of the following polymerization methods: block polymerization, solution polymerization, suspension polymerization, blow polymerization, and emulsion polymerization.

In addition, it is possible to use so-called reclaimed powdered PTFE which is obtained by molding virgin PTFE obtained by one of the above-described polymerization methods and then, sintering the molded PTFE and then, pulverizing the sintered PTFE; so-called powdered PTFE lubricating powder obtained by treating the virgin PTFE with gamma lay irradiation or the like; and finely powdered PTFE obtained by pulverizing the virgin PTFE.

Favorably, the average diameter of the PTFE is smaller than 30 $\mu$m and more favorably, smaller than 15 $\mu$m to allow the thickness of the surface coating layer and the surface roughness thereof to be uniform. It is preferable that the minimum diameter of the PTFE is greater than the diameter at which the PTFE powders agglomerate.

It is preferable to mix 70–150 parts by weight of the PTFE powders with 100 parts by weight of the fluorine-containing resin having the reactive groups in the molecules thereof. If the part by weight of the PTFE powders is less than 70, the surface coating layer has a poor lubricating performance. If the part by weight of the PTFE powders is more than 150, the surface coating layer has a poor adhesiveness to the elastomer.

The organosilicone elastomer of the present invention contains organosiloxane bond at the main chains of the molecules thereof and displays rubber elasticity. For example, methyl silicone rubber, vinyl-methyl silicone rubber, phenyl-methyl silicone rubber, and fluorinated silicone rubber can be preferably used. Preferably, these rubbers are cured at 150°–180° C. by adding curing agent thereto and pulverized or cured rubbers are subjected to secondary curing at 190°–220° C. and then, pulverized.

It is preferable that the average diameter of the organosilicone elastomer is 1 $\mu$m–10 $\mu$m. It is favorable to mix 10–50 parts by weight of the organosilicone elastomer with 100 parts by weight of the fluorine-containing resin having the reactive groups in the molecules thereof. It is more favorable to mix 30–50 parts by weight of the former with 100 parts by weight of the latter. If the average diameter of the organosilicone elastomer is greater than 10 $\mu$m or if the mixing amount thereof is more than 50 parts by weight, the surface coating layer has a low strength and a deteriorated wear resistance. If the average diameter of the organosilicone elastomer is smaller than 1 $\mu$m, the dispersibility thereof in the surface coating layer is unfavorable and the sliding performance and wear resistance of the surface coating layer deteriorate. If the mixing amount of the organosilicone elastomer is smaller than 10 parts by weight, the surface coating layer has deteriorated sliding performance and wear resistance.

It is possible to mix the powdered solid lubricant with the fluorine-containing resin to improve the sliding performance and wear resistance of the surface coating layer. The solid lubricant includes graphite, molybdenum disulfide ($MoS_2$), carbon, boron nitride, graphite fluoride, and tungsten disulfide ($WS_2$). These solid lubricants can be used singly or as a mixture.

The graphite and the molybdenum disulfide are most favorable of the above-described solid lubricants. Both artificial graphite and natural graphite can be used. It is preferable that the average diameter of the solid lubricant is 0.5 $\mu$m–12 $\mu$m. If the average diameter of the solid lubricant is greater than 12 $\mu$m, the surface coating layer has a degraded wear resistance. If the average diameter of the solid lubricant is smaller than 0.5 $\mu$m, it has a degraded dispersibility in the surface coating layer.

By mixing an appropriate amount of the solid lubricant with the fluorine-containing resin, the sliding performance and wear resistance of the surface coating layer can be improved; the judder of the wiper blade can be suppressed; and the wiping performance thereof can be improved.

It is favorable to mix 10–110 parts by weight of the solid lubricant with 100 parts by weight of the fluorine-contained resin having the reactive groups in the molecules thereof. It is favorable to mix 25–65 parts by weight of the graphite with 100 parts by weight of the fluorine-containing resin to suppress judder of the wiper blade and improve the wiping performance of the surface coating layer. If the mixing amount of the solid lubricant is more than 110 parts by weight, the surface coating layer has a deteriorated wear resistance. If the mixing amount of the solid lubricant is smaller than 10 parts by weight, the surface coating layer has deteriorated sliding performance and wear resistance, and in addition, is liable to judder when the wiper blade slides in contact with the surface of a transparent material, especially the water-repellent surface of a transparent material, for example, a glass surface.

Examining the correlation between the judder and the state of the surface coating layer, the surface coating layer of the present invention which showed a superior characteristic in a wiper blade test which will be described later had stripes thereon in the lengthwise direction of the wiper blade.

The transparent material of the present invention means a transparent substance which allows light to pass therethrough. The transparent substance includes glasses such as plate glass, reinforced glass, laminated glass; transparent ceramics such as transparent alumina; transparent plastics such as acrylic resin.

To perform a water-repellent treatment is to treat a glass surface or the like with a water-repellent agent containing silicone or fluorine. The water-repellent agent containing silicone is classified into two types: One type of the water-repellent agent is coated on the surface of the transparent material such as a glass surface and the other type is window-washing liquid. As examples of the former, "Super rain X" (trade name, manufactured by Kinnodo Co., Ltd.), "Super rain X plus" (trade name, manufactured by Kinnodo Co., Ltd.), "Soft 99 galaco" (trade name, manufactured by Soft 99 Corp.), and "Nuri Nuri Galaco" (trade name, manufactured by Soft 99 Corp.) are commercially available. As examples of the latter type, "Super Washer Z" (trade name, manufactured by Augu Co., Ltd.) and "Galaco washer liquid" (trade name, manufactured by Soft 99 Corp.) are commercially available.

As examples of the water-repellent agent containing fluorine, "Super galaco" (trade name, manufactured by Soft 99 Corp.) and "Nissan Water-repellent Agent System" (manufactured by Nissan Motor Co., Ltd.). These water-repellent agents are coated on a glass surface.

A glass surface having even one layer treated with the water-repellent agent causes the wiper blade to judder thereon.

The surface coating layer of the present invention is capable of containing various substances, provided that they do not deteriorate the effect of the present invention.

Such mixing substances include inorganic fillers such as mica, talc, kaolin, calcium carbonate, and calcium sulfate; resins such as polyamide resin, polyimide resin, polyamide-imide resin, polyether imide resin, polyphenylene sulfide resin, polyolefin resins such as polyethylene and polypropylene, polyacetal resin, aromatic polyester resin, aromatic polyether ketone resin, aromatic polyether ether ketone resin, and polyurethane resin; rubbers such as fluorine rubber, urethane rubber, polyethylene rubber, polybutadiene rubber, and thermoplastic elastomer; fibers such as potassium titanate fiber, glass fiber, carbon fiber, aluminum borate whisker fiber, wollastnite, and aramid fiber.

The liquid for forming the surface coating layer is obtained by dissolving or dispersing, in an organic solvent, a mixture of the fluorine-containing resin having the reactive groups in the molecules thereof, the hardening agent, polytetrafluoroethylene resin, an organosilicone elastomer, and the solid lubricant. The above substances are mixed with each other in the following methods: According to a first mixing method, the fluorine-containing resin is mixed with the PTFE, the organosilicone elastomer, and various components, and then, the hardening agent is added to the mixture; according to a second mixing method, after the PTFE, the organosilicone elastomer, and various components are mixed with each other to form a mixture by a mixer, the fluorine-containing resin is mixed with the mixture, and then, the hardening agent is added to the mixture; according to a third mixing method, all the components are mixed with each other all together.

The wiper blade of the present invention will be described below with reference to FIG. 1 showing it in section.

The wiper blade 1 comprises a sliding-contact part 2 slidably contacting a glass surface; a fixing part 3 fixed to the fixing part of a wiper; a surface coating layer 4 formed on the sliding-contact part 2 positioned at both side surfaces of the blade body. The surface coating layer 4 is not formed on the top surface 5 of the wiper blade 1. The wiper blade 1 having this shape has a favorable wiping performance without vibrating on a glass surface treated with the water-repellent agent. This superior performance of the wiper blade can be enhanced by forming, on the wiper blade 1, a surface coating layer of a mixture of 100 parts by weight of the fluorine-containing resin and 10–110 parts by weight of the solid lubricant.

The method, of the present invention, for forming the surface coating layer on the surface of the blade body is not limited to a specified one, provided that it allows the surface coating layer to be formed thereon smoothly and uniformly. For example, spray method, dipping method or brush painting method can be adopted. The above-described mixture for forming the surface coating layer can be obtained by dissolving or dispersing the above-described components in the organic solvent consisting of aromatic solvents such as toluene, solvent naphtha; ketones such as acetone, methyl ethyl ketone; esters such as methyl acetate, ethyl acetate, isoamyl acetate, butyl acetate; and ethers such as diethyl ether, dioxane.

The surface coating layer applied to the surface of the blade body is heat-treated and cured at 30–100° C. for 5 minutes–48 hours. Preferably, as the heat-treating condition, the temperature is set to 70° C.–90° C. and the period of time is set to 5–15 minutes to improve productivity.

The method of forming the surface coating layer on both side surfaces of the blade body is described with reference to FIG. 2A and FIG. 2B showing an example of a method of manufacturing the wiper blade of the present invention. The surface coating layer 4 is formed on both side surfaces of each of two unseparated blade bodies 6, as shown in FIG. 2A. Then, a portion 7 is cut to form the top surface of the blade. In this manner, the two wiper blades 1, 1 having no surface coating layer formed on the top end of each blade is obtained, as shown in FIG. 2B. This method is particularly favorable to enhance the accuracy of the edge (top end) of the wiper blade.

Methods can be used, provided that they do not form the surface coating layer on the top surface 5 of the blade. For example, it is possible to adopt a method of forming a coating layer on the entire surface of the blade and cutting the top end of the blade.

Favorably, the thickness of the surface coating layer is 2 $\mu$m–50 $\mu$m and more favorably, 3 $\mu$m–20 $\mu$m. The surface coating layer having a thickness in the above range has superior following ability with the blade body made of an elastomer and durablity. The surface coating layer having a thickness smaller than 2 $\mu$m is inferior in its durability. The surface coating layer having a thickness greater than 50 $\mu$m is inferior in its initial wiping performance.

Materials which are used in embodiments and comparative examples are shown below.
1) Fluorine-containing resin having hydroxyl group (—OH): Fluonate K702 (trade name, manufactured by Dainippon Ink & Chemicals Inc.)
2) PTFE: KTL-8F (trade name, manufactured by Kitamura Co., Ltd.)
3) Organosilicone elastomer: powder obtained by pulverizing cured material of EL5504 (trade name, Wacker Chemicals East Asia Ltd.)
4) Graphite: graphite CSSP (trade name, Nippon Graphite Industries, Ltd.)

5) Molybdenum disulfide ($MoS_2$): Molycoat micro size (trade name, Dow Corning Corp.)
6) Isocyanate compound (hardening agent-1): Verknock DN-990S (trade name, manufactured by Dainippon Ink & Chemicals Inc.)
7) Melamine resin (hardening agent-2): hexamethoxyl methylated melamine (manufactured by Dainippon Ink & Chemicals Inc.)
8) Polyurethane resin: D6-439 (trade name, manufactured by Dainippon Ink & Chemicals Inc.)
9) Urethane modified epoxy resin: D-1362 (trade name, manufactured by ACR Corp.)
10) Diglycidyl ester: IPU-22G (trade name, Okamura Seiyu Co., Ltd.)
11) Polyvinylidene fluoride-1: KF polymer, type H (trade name, manufactured by Kureha Chemical Industry Co. Ltd.)
12) Polyvinylidene fluoride-2: Paraprene P27MRNAT (trade name, manufactured by Nippon Elastoran Co., Ltd.)
13) Hardening agent-3: TXA525 (trade name, manufactured by Fuji Kasei Kogyo Co., Ltd.)
14) Blade body: curing agent, curing accelerator, auxiliaries for curing accelerator, age resistor, processing aid, reinforcing agent such as carbon black, filler agent and the like are added to a natural rubber (NR), styrene-butadiene rubber (SBR) or acrylonitrile-butadiene rubber (NBR) to form an elastomer having a rubber hardness of 60° after curing.

Embodiment 1–Embodiment 6

100 parts by weight of fluorine-containing resin having hydroxyl group was diluted with 200 parts by weight of toluene and 400 parts by weight of methyl ethyl ketone. Then, materials each having the proportion shown in table 1 were added to the solution. Then, hardening agents each having the proportion shown in table 1 were added to the solution to obtain a surface layer-forming liquid.

The surface layer-forming liquid was applied to both side surfaces of a blade body 6 having a shape shown in FIG. 2A by spray method and then hardened in the condition shown in table 1. After the surface coating layer 4 was formed, the portion 7 was cut to form the top surface of the blade to obtain the wiper blade 1. The wiper blade 1 had a length of 500 mm. The blade body was made of chlorinated natural rubber (NR) or chlorinated styrene-butadiene rubber (SBR). The thickness of the surface coating layer was 8 $\mu$m–15 $\mu$m.

As the specimen for evaluating the characteristic of the wiper blade, surface coating layers were formed on sheets made of chlorinated natural rubber (NR) or chlorinated styrene-butadiene rubber (SBR) by a method similar to the above-described method. Each specimen had a size of 150 mm (length)×150 mm (width)×2 mm (thickness).

Wiper blades and specimens thus obtained were evaluated by a method described below. Evaluated results are shown in table 2.

1) Edge-On-Disc Sliding-Contact Test

A sheet of 150 mm (length)×150 mm (width)×2 mm (thickness) was cut to form specimens 8 each having a size of 10 mm (length)×20 mm (width)×2 mm (thickness). Sliding-contact test was conducted on the specimens by a method as shown in FIG. 3 showing the outline of the method of measuring the coefficient of friction between each specimen and a glass surface and the amount of abrasion thereof.

Each of the specimens 8 was fixed to a jig 9 having a dimension of 10 mm (length)×10 mm (width) by forming an angle of 30° between a glass surface 10 and each specimen 8. Sliding-contact test was conducted to examine the coefficient of friction between the edge of each specimen 8 and the glass surface 10 as well as a glass surface treated with a water-repellent agent and examine the amount of abrasion of the edge of each specimen 8. The test condition was that the glass surface 10 rotated at 60 rpm and a load of 20 g was applied to each specimen 8.

2) Wiper Blade Test

The following tests were conducted on a glass surface and a glass surface treated with silicone-containing water-repellent agent (Super rain X) commercially available, using the wiper blade (shown in FIG. 1) having a length of 500 mm.

2)-1 Wiping Test (to the Glass Surface Alone)

After water was sprinkled over the glass surface, the amount of water left on the glass surface not treated with the Super rain X was visually evaluated, based on the standard shown in table 3.

2)-2 Judder Test

Initial Performance

After water was sprinkled over the glass surface, the degree of judder of the wiper blade was visually evaluated, based on the standard shown in table 4.

Performance of Wiper Blade With Age

Water was sprinkled over the glass surface while the wiper blade was operated to measure the period of time until the evaluation standard point exceeds point 3 in table 4. The test to examine the performance of the wiper blade with age was conducted on the glass surface treated with the water-repellent agent.

2)-3 Abrasion Test

The amount of abrasion of the wiper blade at its edge was measured after the wiper blade was operated at a specified number of times, with water kept to be sprinkled over the glass surface intermittently every certain period of time.

2)-4 Load Test

This test is to measure the maximum amount of load applied to the wiper system operating between the time when water was sprinkled over the glass surface and the time when the glass surface became dry.

2)-5 Peel Test of Water-Repellent Surface-Treating Film

This test is to measure the period of time between the time when the wiper blade started to operate and the time when the water-repellent surface-treating film started to peel off from the blade body while water was kept to be sprinkled over the glass surface treated with the water-repellent agent.

COMPARATIVE EXAMPLE 1

In the same manner as that of the embodiment 1, evaluations were made on the characteristic of the same wiper blade as that used in the embodiment 1 on which the surface coating layer was not formed and made of natural rubber and the same specimen, as that used in the embodiment 1, for evaluating the characteristic of the wiper blade. Test results are shown in table 2.

COMPARATIVE EXAMPLE 2 AND COMPARATIVE EXAMPLE 2

100 parts by weight of fluorine-containing resin having hydroxyl group was diluted with 200 parts by weight of toluene and 400 parts by weight of methyl ethyl ketone.

Then, except the PTFE and the organosilicone elastomer, the solid lubricant and the hardening agent each having the proportion shown in table 1 were added to the solution to obtain a surface layer-forming liquid. In the same condition and method as that of the embodiment 1 and using the surface layer-forming liquid, wiper blades having a surface coating layer of 8–15 μm formed thereon and specimens were obtained.

The wiper blades and the specimens were evaluated in a manner similar to that of the embodiment 1. Test results are shown in table 2.

COMPARATIVE 4

100 parts by weight of polyurethane resin was diluted with 350 parts by weight of methyl ethyl ketone. Then, the materials having the proportion shown in table 1 were added to the solution. Thereafter, the hardening agent having the proportion shown in table 1 was added to obtain a surface layer-forming liquid. In the same condition and method as that of the embodiment 1 and using the surface layer-forming liquid, a wiper blade having a surface coating layer of 8–15 μm formed thereon and a specimen were obtained, except that the hardening condition shown in table 1 was used.

The wiper blade and the specimen were evaluated in a manner similar to that of the embodiment 1. Test results are shown in table 2.

COMPARATIVE EXAMPLE 5

100 parts by weight of resin formed by mixing urethane modified epoxy resin and diglycidyl ester at a weight ratio of 6:4 was diluted with 500 parts by weight of methyl ethyl ketone. Then, the materials each having the proportion shown in table 1 were added to the solution. Thereafter, the hardening agent having the proportion shown in table 1 was added to the solution to obtain a surface layer-forming liquid. In the same condition and method as that of the embodiment 1 and using the surface layer-forming liquid, a wiper blade having a surface coating layer of 8–15 μm formed thereon and a specimen were obtained, except that the hardening condition shown in table 1 was used.

The wiper blade and the specimen were evaluated in a manner similar to that of the embodiment 1. Test results are shown in table 2.

COMPARATIVE EXAMPLE 6

120 parts by volume of resin formed by mixing polyvinylidene fluoride-1 and polyvinylidene fluoride-2 with each other at a volume ratio of 83:17 was diluted with 180 parts by volume of dimethylformamide. Then, the material having the proportion shown in table 1 was added to the solution to obtain a surface layer-forming liquid. In the same condition and method as that of the embodiment 1 and using the surface layer-forming liquid, wiper blades having a surface coating layer of 8–15 μm formed thereon and specimens were obtained, except that the hardening condition shown in table 1 was used.

The wiper blade and the specimen were evaluated in a manner similar to that of the embodiment 1. Test results are shown in table 2.

COMPARATIVE EXAMPLE 7

100 parts by weight of fluorine-containing resin having hydroxyl group was diluted with 200 parts by weight of toluene and 400 parts by weight of methyl ethyl ketone. Then, the materials each having the proportion shown in table 1 were added to the solution. Then, the hardening agent having the proportion shown in table 1 was added to the solution to obtain a surface layer-forming liquid. In the same condition and method as that of the embodiment 1 and using the surface layer-forming liquid and using acrylonitrile-butadiene rubber (NBR) as an elastomer, a wiper blade having a surface coating layer of 8–15 μm formed thereon and a specimen were obtained, except that the hardening condition shown in table 1 was used.

The wiper blade and the specimen were evaluated in a manner similar to that of the embodiment 1. Test results are shown in table 2.

| | | | | | | | Example | | | | | | |
|---|---|---|---|---|---|---|---|---|---|---|---|---|---|
| | | | Embodiment | | | | | | Comparative example | | | | |
| Component *1 | 1 | 2 | 3 | 4 | 5 | 6 | 1 *2 | 2 | 3 | 4 | 5 | 6 | 7 |
| Material of surface coating layer | | | | | | | | | | | | | |
| fluorine-contained resin having hydroxyl group | 100 | 100 | 100 | 100 | 100 | 100 | — | 100 | 100 | — | — | — | 100 |
| PTFE | 120 | 120 | 130 | 120 | 130 | — | — | — | — | 130 | 130 | — | 140 |
| organosilicone elastomer | 38 | 38 | — | 38 | 40 | 40 | — | — | — | 20 | 20 | — | 10 |
| graphite | 38 | 38 | 50 | 38 | — | 30 | — | 50 | — | 3.5 | 3.5 | 15 | 3.5 |
| molybdenum disulfide | — | — | — | — | 30 | 80 | — | — | 50 | — | — | — | — |
| hardening agent-1 | 12 | — | 10 | 12 | 15 | 12 | — | 10 | 10 | 60 | — | — | 12 |
| hardening agent-2 | — | 25 | — | — | — | — | — | — | — | — | — | — | — |
| polyurethane resin | — | — | — | — | — | — | — | — | — | 100 | — | — | — |
| urethane modified epoxy resin | — | — | — | — | — | — | — | — | — | — | 60 | — | — |
| diglycidyl ester | — | — | — | — | — | — | — | — | — | — | 40 | — | — |
| polyvinylidene fluoride-1 | — | — | — | — | — | — | — | — | — | — | — | 83 | — |
| polyvinylidene fluoride-2 | — | — | — | — | — | — | — | — | — | — | — | 17 | — |
| hardening agent-3 | — | — | — | — | — | — | — | — | — | — | 60 | — | — |
| Material of blade body | | | | | | | | | | | | | |

-continued

|  | Example | | | | | | | | | | | | |
|---|---|---|---|---|---|---|---|---|---|---|---|---|---|
|  | Embodiment | | | | | | Comparative example | | | | | | |
| Component *1 | 1 | 2 | 3 | 4 | 5 | 6 | 1 *2 | 2 | 3 | 4 | 5 | 6 | 7 |
| natural rubber (chlorinated) | ○ | ○ | ○ | — | ○ | ○ | ○ | ○ | ○ | ○ | ○ | ○ | — |
| SBR (chlorinated) | — | — | — | ○ | — | — | — | — | — | — | — | — | NBR |
| Hardening condition | | | | | | | | | | | | | |
| hardening temperature (° C.) | 80 | 70 | 80 | 80 | 80 | 80 | — | 80 | 80 | 80 | 80 | 100 | 80 |
| hardening time period (minute) | 15 | 300 | 15 | 15 | 15 | 15 | — | 15 | 15 | 30 | 30 | 30 | 30 |

Remarks:
*1: Unit of each component is indicated by parts by weight except that unit of each component of comparative example 6 is indicated by parts by volume
*2: Blade body of comparative example 1 does not have surface coating layer

|  | Example | | | | | | | | | | | | |
|---|---|---|---|---|---|---|---|---|---|---|---|---|---|
|  | Embodiment | | | | | | Comparative example | | | | | | |
| Items | 1 | 2 | 3 | 4 | 5 | 6 | 1 | 2 | 3 | 4 | 5 | 6 | 7 |
| Edge-on-disc sliding contact test | | | | | | | | | | | | | |
| glass surface not treated with water-repellent agent | | | | | | | | | | | | | |
| friction coefficient | 0.19 | 0.23 | 0.25 | 0.19 | 0.23 | 0.25 | 0.49 | 0.38 | 0.39 | 0.27 | 0.28 | 0.41 | 0.26 |
| abrasion amount (mg) | 1.2 | 1.3 | 1.7 | 1.5 | 1.8 | 1.9 | 6.2 | 4.7 | 4.5 | 2.2 | 2.2 | 3.7 | 2.4 |
| glass surface treated with water-repellent agent | | | | | | | | | | | | | |
| friction coefficient | 0.11 | 0.14 | 0.17 | 0.11 | 0.12 | 0.18 | *1 | 0.37 | 0.35 | 0.25 | 0.25 | 0.39 | 0.23 |
| abrasion amount (mg) | 0.4 | 0.5 | 0.9 | 0.4 | 0.4 | 0.8 | 9.4*2 | 3.9 | 4.2 | 1.4 | 1.9 | 4.0 | 1.3 |
| Wiper blade test | | | | | | | | | | | | | |
| glass surface not treated with water-repellent agent | | | | | | | | | | | | | |
| evaluation of wiping performance (mark) | 4.0 | 4.0 | 4.0 | 4.5 | 4.0 | 4.0 | 4.0 | 3.0 | 3.0 | 4.0 | 4.0 | 3.0 | 4.0 |
| evaluation of vibration (mark) | 4.0 | 4.0 | 4.0 | 4.5 | 4.0 | 4.0 | 4.0 | 3.0 | 3.0 | 4.0 | 3.0 | 3.0 | 4.0 |
| abrasion amount (mg) | 0.48 | 0.44 | 0.54 | 0.50 | 0.50 | 0.54 | 0.54 | 0.51 | 0.52 | 0.45 | 0.45 | 0.51 | 0.45 |
| maximum load (kg) | 0.56 | 0.51 | 0.61 | 0.52 | 0.69 | 0.69 | 1.01 | 0.92 | 0.99 | 0.88 | 0.89 | 0.91 | 0.87 |
| glass surface treated with water-repellent agent | | | | | | | | | | | | | |
| evaluation of vibration (mark) | 3.5 | 3.5 | 3.5 | 4.0 | 3.5 | 3.5 | 3.5 | 3.0 | 3.0 | 3.5 | 3.0 | 3.0 | 3.5 |
| *3 | >8.0 | >8.0 | >8.0 | >8.0 | >8.0 | >8.0 | 3.0 | 4.5 | 4.2 | 5.2 | 5.5 | 5.6 | 5.7 |
| abrasion amount (mg) | 0.48 | 0.52 | 1.24 | 0.60 | 0.77 | 1.14 | 3.18 | 2.74 | 2.94 | 1.96 | 2.11 | 2.10 | 1.90 |
| maximum load (kg) | 0.56 | 0.50 | 0.62 | 0.51 | 0.60 | 0.63 | 0.65 | 0.65 | 0.67 | 0.64 | 0.65 | 0.64 | 0.64 |
| *4 | 2.0 | 2.2 | 2.0 | 2.4 | 2.0 | 2.0 | 1.0 | 0.8 | 0.7 | 1.1 | 1.1 | 1.2 | 1.1 |

Remarks:
*1: unmeasurable in 15 hours
*2: abrasion amount in 15 hours
*3: time period in which acceptable degree of vibration is maintained (hour)
*4: water-repellent surface-treating film started to peel off from blade body (hour)

TABLE 3

| Standard points for evaluation | Standard content for evaluating wiping performance |
|---|---|
| 5 | Completely wiped |
| 4 | Line-shaped wiping marks scatters on glass |
| 3 | Unclear wiping marks are left except in center |
| 2 | Clear wiping marks are left at several positions |
| 1 | Wiping marks are left entirely on glass surface |

TABLE 4

| Standard points for evaluation | Standard content for evaluating vibration |
|---|---|
| 5 | Judders are not observed visually |
| 4 | Judders occur only when wiper blade is turned around |
| 3 | Judders are observed on entire glass surface |
| 2 | Blade bounds on glass surface and stripes are left thereon |
| 1 | Blade bounds a long distance |

As indicated in table 2, the wiper blade of the embodiments 1 through 6 are superior to that of the comparison examples 1 through 7 in the edge-on-disc sliding-contact test and the wiper blade test.

Embodiment 7

Figure 4:
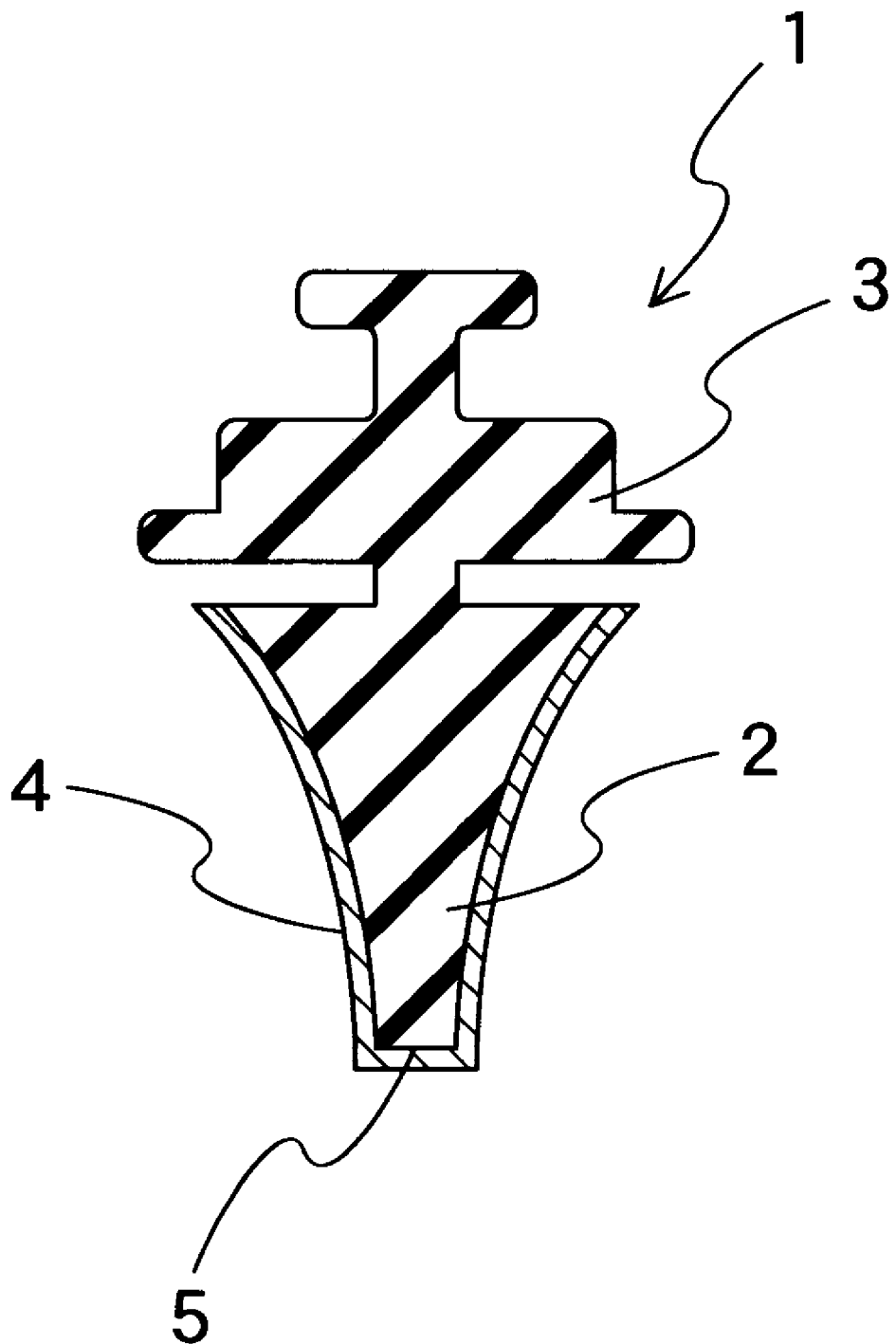
FIG. 4 is a sectional view showing a wiper blade obtained with embodiment 7.

Except that the surface coating layer was formed on the sliding-contact part 2 and the top surface 5 of the blade by using the wiper blade 1 having the shape shown in FIG. 1, a wiper blade was obtained in the same condition and method as that of the embodiment 1. FIG. 4 shows a sectional view of the wiper blade obtained with embodiment 7. The wiper blade was evaluated in the same condition and method as that of the embodiment 1. The result was that the maximum load applied to an ordinary (not treated with water-repellent agent) glass surface was 0.69 kg. To the glass surface treated with water-repellent agent, the time period in which acceptable degree of judder was maintained was more than eight hours; the amount of abrasion was 1.02 mg; and the period of time to start peeling off the water-repellent surface-treating film from glass surface was 2.0 hours.

As shown above, in the case of the glass surface not treated with water-repellent agent, the wiper blade of the embodiments 1 through 7 showed superior maximum load characteristics and in the case of the glass surface treated with the water-repellent agent, it was superior to that of the comparison examples 1 through 7 in the time period in which acceptable degree of judder was maintained; the amount of abrasion; and the period of time between the time when the wiper blade started to operate and the time when the water-repellent surface-treating film started to peel off from the blade body.

As apparent from the foregoing description of the embodiments, the wiper blade of the present invention is superior in its wiping performance, judder-suppressing performance, and durability.

The surface coating layer is formed of the fluorine-containing resin containing the hydroxyl group; the isocyanate compound and/or the melamine resin used as the hardening agent; the polytetrafluoroethylene resin; and the organosilicone elastomer. The surface coating layer having this structure improves the above-described characteristics, thus having favorable wiping performance, judder-suppressing performance, and durability for the surface of a transparent material treated with the water-repellent agent.

According to the method of manufacturing the wiper blade, the surface coating layer is cut off from the blade body after the surface coating layer is formed thereon. Thus, the surface coating layer is present only on both side surfaces of the blade body, and the wiper blade has a high degree of edge accuracy.

What is claimed is:

1. A judder-suppressing wiper blade comprising,
 a body made of an elastomer and
 a surface coating layer on the body, the coating layer comprising a fluorine-containing resin having hydroxyl groups in a molecule thereof and a hardening agent having reactivity with the hydroxyl groups,
 wherein the surface coating layer is formed only on both side surfaces of the body.

2. A wiper blade according to claim 1, wherein the surface coating layer comprises a mixture of 100 parts by weight of the fluorine-containing resin having hydroxyl groups in the molecule thereof and 10–110 parts by weight of a solid lubricant consists essentially of a lubricant selected from the group consisting of a graphite, molybdenum disulfide, carbon, boron nitride and tungsten disulfide.

3. A wiper blade according to claim 2, wherein the solid lubricant consists essentially of graphite.

4. A wiper bade according to claim 1, wherein the hardening agent comprises at least one agent selected from the group consisting of an isocyanate compound and a melamine resin.

5. A wiper blade according to claim 1, wherein the surface coating layer further comprises polytetrafluoroethylene resins.

6. A wiper blade according to claim 1, wherein the surface coating layer further comprises organosilicone elastomers.

7. A judder-suppressing wiper blade comprising,
 a body made of an elastomer and
 a surface coating layer on the body, the coating layer comprising a fluorine-containing resin having hydroxyl groups in a molecule thereof and a hardening agent having reactivity with the hydroxyl groups,
 wherein the surface coating layer comprises a mixture of 100 parts by weight of the fluorine-containing resin having the hydroxyl groups in the molecule thereof and 10–110 parts by weight of a solid lubricant consists essentially of a lubricant selected from the group consisting of a graphite, molybdenum, disulfide, carbon, boron nitride and tungsten disulfide.

8. A wiper blade according to claim 7, wherein the hardening agent comprises at least one agent selected from the group consisting of an isocyanate compound and a melamine resin.

9. A wiper blade according to claim 7, wherein the surface coating layer further comprises polytetrafluoroethylene resins.

10. A wiper blade according to claim 7, wherein the surface coating layer further comprises an organosilicone elastomers.

11. A wiper blade according to claim 7, wherein the solid lubricant consists essentially of graphite.

12. A wiper blade according to claim 7, wherein the surface coating layer slidably contacts a surface of a transparent material having at least one layer water-repellently treated.

13. A wiper blade according to claim 12, wherein said water-repellant agent is a silicone-containing agent.

14. A judder-suppressing wiper blade for a glass surface treated with water-repellant agent comprising,
 a body made of an elastomer and
 a surface coating layer on the body, the coating layer comprising a fluorine-containing resin having hydroxyl groups in a molecule thereof and a hardening agent having reactivity with the hydroxyl groups,
 wherein the surface coating layer is formed only on both side surfaces of the body.

15. A wiper blade for a glass surface treated with water-repellant agent comprising,
 a body made of an elastomer and
 a surface coating layer on the body, the coating layer comprising a fluorine-containing resin having hydroxyl groups in a molecule thereof and a hardening agent having reactivity with the hydroxyl groups, wherein the surface coating layer is formed only on both side surfaces of the body.

16. A judder-suppressing wiper blade for a glass surface treated with water-repellant agent comprising, a body made of an elastomer and a surface coating layer on the body, the coating layer comprising a fluorine-containing resin having hydroxyl groups in a molecule thereof and a hardening agent having reactivity with the hydroxyl groups, wherein the surface coating layer comprises a mixture of 100 parts by weight of the fluorine-containing resin having the hydroxyl group in the molecule thereof and 10–110 parts by weight of a solid lubricant consists essentially of a lubricant selected from the group consisting of a graphite, molybdenum disulfide, carbon, boron nitride and tungsten disulfide.

17. A wiper blade for a glass surface treated with water-repellant agent comprising, a body made of an elastomer and a surface coating layer on the body, the coating layer comprising a fluorine-containing resin having hydroxyl groups in a molecule thereof and a hardening agent having reactivity with the hydroxyl groups, wherein the surface coating layer comprises a mixture of 100 parts by weight of the fluorine-containing resin having the hydroxyl groups in the molecule thereof and 10–110 parts by weight of a solid lubricant consists essentially of a lubricant selected from the group consisting of a graphite, molybdenum disulfide, carbon, boron nitride and tungsten disulfide.

* * * * *